United States Patent [19]

Van Hattum

[11] 3,906,307

[45] Sept. 16, 1975

[54] CIRCUIT ARRANGEMENT FOR PRODUCING A SAWTOOTH CURRENT THROUGH A LINE DEFLECTION COIL IN AN IMAGE DISPLAY APPARATUS

[75] Inventor: Johannes Simon Albert Van Hattum, Eindhoven, Netherlands

[73] Assignee: U.S. Philips Corporation, New York, N.Y.

[22] Filed: Nov. 29, 1973

[21] Appl. No.: 420,252

[30] Foreign Application Priority Data

Dec. 19, 1972 Netherlands ....................... 7217254

[52] U.S. Cl. .................. 315/408; 315/410; 315/399

[51] Int. Cl.[2] ...................... H01J 29/70; H01J 29/76

[58] Field of Search ........... 315/28, 29, 27 TD, 399, 315/407, 408, 409, 410

[56] References Cited

UNITED STATES PATENTS

| | | | |
|---|---|---|---|
| 3,699,356 | 10/1972 | Berwin | 315/29 |
| 3,757,144 | 9/1973 | Hetterscheid et al. | 315/27 TD |
| 3,784,871 | 1/1974 | Vacher | 315/29 |

OTHER PUBLICATIONS

Wessel, Peter L., A New Horizontal Output Deflection Circuit, IEEE Transactions on Broadcast and Television Receivers, Aug. 1972, Vol. BTR-18, No. 3, pp. 177–182.

*Primary Examiner*—Maynard R. Wilbur
*Assistant Examiner*—T. M. Blum
*Attorney, Agent, or Firm*—Frank R. Trifari; Henry I. Steckler

[57] ABSTRACT

A circuit arrangement which is the combination of a switched supply circuit and a line deflection circuit, the supply transformer being replaced by a coil.

3 Claims, 6 Drawing Figures

CIRCUIT ARRANGEMENT FOR PRODUCING A SAWTOOTH CURRENT THROUGH A LINE DEFLECTION COIL IN AN IMAGE DISPLAY APPARATUS

The invention relates to a circuit arrangement for producing a sawtooth current through a line deflection coil in an image display apparatus, which coil is part of a resonance circuit comprising also a trace capacitor and a retrace capacitor, switching means applying the voltage across the trace capacitor to the deflection coil at line frequently during the trace interval of the sawtooth current, which switching means comprise a first diode and a controlled switch connected in parallel with the first diode via a second diode, and an inductive element having a winding which is connected to the resonance circuit via a third diode, the winding and the third diode passing current during the cut-off period of the switch.

Such a circuit arrangement is described in "IEEE Transactions on Broadcast and Television Receivers", August 1972, Volume BTR-18, No. 3, pages 177 to 182. In the circuit arrangement described the said winding is the secondary winding of a transformer the primary of which has the same number of turns and is connected between a supply source and the junction point of the controlled switch and the second diode. During the time in which the switch, which is a transistor, is conducting a current flows in the primary winding so that energy is derived from the supply source and stored in the transformer. This takes place during part of the trace interval. During the retrace interval, immediately thereupon and during the succeeding part of the trace interval the third diode is conducting, the said energy causing a current to flow through the secondary winding. Because in the known circuit arrangement the end of the secondary winding not connected to the third diode and the retrace capacitor is connected to earth, the voltage difference between the said end and that end of the primary which is connected to the transistor and the second diode always is equal to the voltage of the supply source. For this purpose it is required that the transformation ratio of the transformer should exactly be unity.

Another condition to be satisfied is that the transformer has a very low leakage self-induction, for in the presence of leakage self-induction the circuit arrangement behaves as if a self-induction should be connected in series with the primary winding. At the beginning of the retrace interval the transistor and the second diode are cut off whilst the third diode becomes conducting. Owing to the additional self-induction which the leakage self-induction represents, however, the secondary current cannot immediately take over from the primary current. Between the collector of the transistor and earth a voltage peak is produced which may be very steep and even steeper than is permissible. Hence the switch-off dissipation also will be comparatively high. As a result the transistor may be damaged.

It is true that winding methods are known by which the impedance of the leakage self-induction can considerably be reduced, however, it cannot be made negligible, especially at the comparatively high line repetition frequency, whilst the use of the said methods causes the transformer to become expensive. It is an object of the present invention to provide a circuit arrangement the effect of which is not different from the known arrangement but in which the said current take-over is not performed by a transformer, and for this purpose the circuit arrangement according to the invention is characterized in that a current which is supplied to the controlled switch by a direct-voltage source connected between the winding and the switch also flows through the winding.

It should be noted that in the circuit arrangement according to the invention the said winding may still be a winding of a transformer in the same manner as in the known circuit arrangement, for on the same core further windings may be wound across which voltages are set up which after rectification may be used to supply other parts of the image display apparatus. Although the resulting transformer has leakage, this does not influence the current take-over between the transistor and the third diode.

Embodiments of the invention will now be described by way of example with reference to the accompanying diagrammatic drawings, in which.

Figure 1:
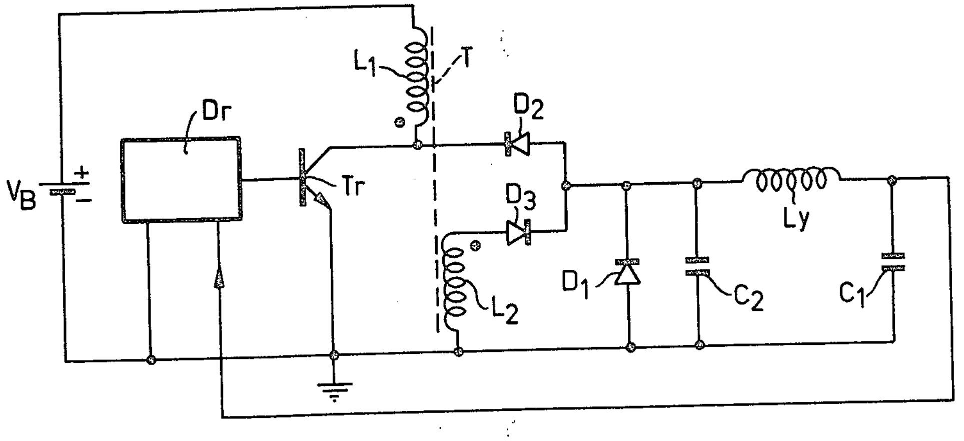
FIG. 1 shows the known circuit arrangement.

FIG. 1 shows the circuit arrangement described in the paper referred to at the beginning of this specification. Reference symbol $L_y$ denotes the line deflection coil which is connected in series with a trace capacitor $C_1$. A diode $D_1$ with the polarity shown and a retrace capacitor $C_2$ are connected in parallel with the said series combination. The capacitor $C_2$ may alternatively be connected in parallel with the deflection coil $L_y$. A secondary winding $L_2$ of a transformer T is connected in series with a diode $D_3$ the cathode of which is connected to the junction point of elements $D_1$, $C_2$ and $L_y$ and to the anode of a diode $D_2$. The cathode of the diode $D_2$ is connected to an end of a primary winding $L_1$ of the transformer T and to the collector of an n-p-n transistor Tr. The positive terminal of a direct-voltage source $V_B$ is connected to the other end of the winding $L_1$ and its negative terminal is connected to the emitter of the transistor Tr. This negative terminal is also connected to the free ends of the elements $L_2$, $D_1$, $C_2$ and $C_1$ and may be connected to earth. A driver circuit Dr controls the base of the transistor Tr. The windings $L_1$ and $L_2$ have equal numbers of turns and are wound so that an increase of the alternating voltage at the junction point of the winding $L_2$ and the diode $D_3$ corresponds to an increase of the alternating voltage at the collector of the transistor Tr, which is indicated by dots in FIG. 1.

During a first part of the line trace interval the diode $D_1$ is conducting. The voltage across the capacitor $C_1$ is applied to the deflection coil $L_y$ which passes a sawtooth deflection current. At a given instant the transistor Tr becomes conducting. When about at the middle of the trace interval the deflection current changes direction, the diode $D_1$ is cut off and the diode $D_2$ becomes conducting, so that the deflection current now flows through the transistor Tr whilst the diode $D_3$ is cut off. At the end of the trace interval the transistor Tr is cut off. An oscillation is produced across the capacitor $C_2$, whilst the energy derived from the source $V_B$ and stored in the winding $L_1$ causes a current to flow through the diode $D_3$. When the voltage across the capacitor $C_2$ becomes zero again, the diode $D_1$ becomes conducting: this is the beginning of a new trace interval. The diode $D_3$ continues conducting until the transistor $T_r$ is rendered conducting, the energy stored in the winding $L_2$ being transferred to the winding $L_1$. Stabilisation is provided, for example, by feedback of the voltage across the capacitor $C_1$ to the driver circuit Dr in which a comparison stage and a modulator ensure that the conduction period of the transistor Tr is varied in a manner such that the said voltage and hence the amplitude of the deflection current remain constant.

Figure 2:
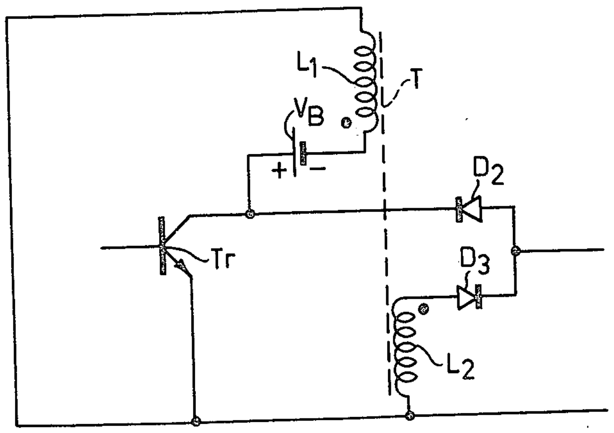
FIG. 2 shows a modification thereof.

In the known circuit arrangement shown in FIG. 1 the voltage difference between the ends of the windings $L_1$ and $L_2$ indicated by dots invariably is equal to the voltage of the source $V_B$, for the other ends are connected to the positive and negative terminals respectively whilst the alternating voltages across the windings are equal. Because the source $V_B$ and the winding $L_1$ are connected in series, they may in theory be interchanged. This is the case in FIG. 2. In FIG. 2 the dot-denoted ends of the windings $L_1$ and $L_2$ always have the same potential, i.e. the windings are effectively connected in parallel. Consequently the circuit arrangement of FIG. 2 may be replaced by that of FIG. 3 in which a single coil L' is substituted for the two windings. Thus the transformer T has entirely been dispensed with so that the aforementioned disadvantages cannot occur, whilst the take-over from the current flowing through the winding $L_1$ by the current flowing through the winding $L_2$ and vice versa cannot give rise to problems, since both windings have been replaced by one coil L'. The operation of the circuit arrangement of FIG. 3 obviously is identical with that of the circuit arrangement of FIG. 1. In particular, the primary current of FIG. 1 flows through the loop constituted by the coil L', the source $V_B$ and the transistor Tr, whilst the secondary current of FIG. 1 flows through the coil L' and the diode $D_3$ in FIG. 3. In the coil L' the two currents have the same direction. For the sake of clarity the driver circuit Dr and the feedback path are not shown in FIG. 3.

Figure 3:
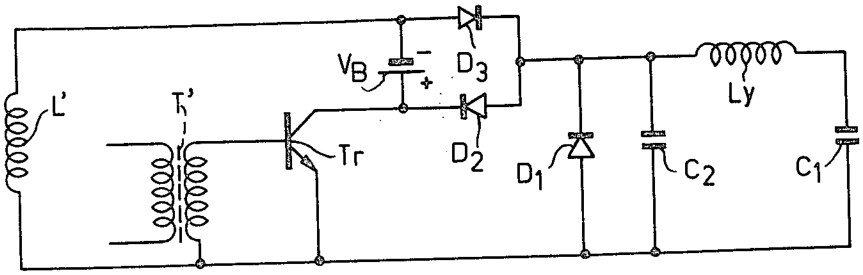
FIGS. 3 to 6 show embodiments of the circuit arrangement according to the invention.

In the circuit arrangement shown in FIG. 3 one of the terminals, for example the negative terminal, of the source $V_B$ may be connected to earth. This has the disadvantage that the emitter of the transmitter Tr is not connected to a reference voltage. Retrace pulses are produced between the emitter and earth, which requires good insulation between the secondary and primary windings of a driver transformer T' by which the driver circuit Dr and the base of the transistor Tr are connected. Otherwise the said pulses may interfere with the operation of the circuit on the primary side of the transformer T'. As a result the driver transformer T' in turn becomes more expensive. This disadvantage is obviated by the modified embodiment shown in FIG. 4 in which a p-n-p transistor is used. In this circuit arrangement the emitter of the transistor Tr is connected to earth for alternating currents either directly or via the source $V_B$.

Figure 4:
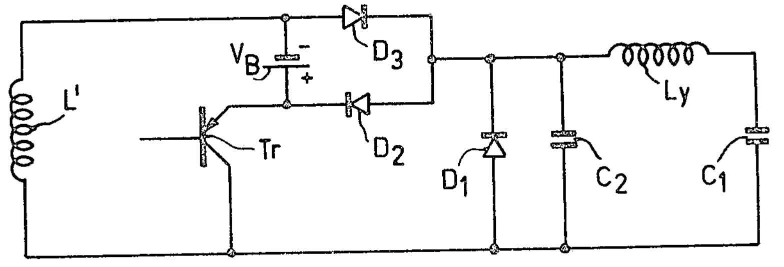
Figure 5:
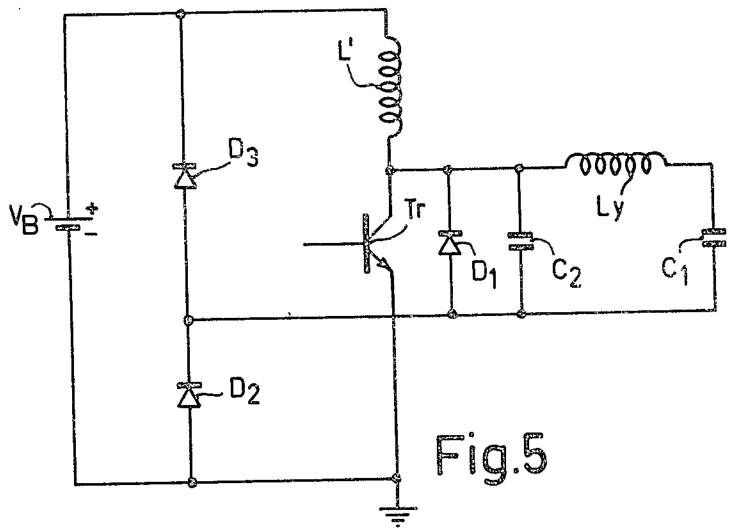

FIG. 5 shows another embodiment of the circuit arrangement according to the invention. In this embodiment the transistor Tr of FIG. 4 is replaced by a transistor of the n-p-n type, the pass direction of the three diodes and the polarity of the source $V_B$ being reversed. In this embodiment both the negative terminal of the source $V_B$ and the emitter of the transistor Tr may be connected to earth, the effect being equal to that of the known circuit arrangement, for at the beginning of the trace interval the deflection current flows through the diode $D_1$ and the deflection coil $L_y$ to the capacitor $C_1$. In the other direction the current flows from the capacitor $C_1$ through the deflection coil $L_y$, the transistor Tr and the diode $D_2$. The primary current of the known circuit arrangement flows from the source $V_B$ through the coil L' and the transistor Tr, whilst the secondary current flows through the diode $D_3$, the coil L' and either through the diode $D_1$ or to the circuit $C_2$, $L_y$, $C_1$. Both currents traverse the coil L' in the same direction, so that the current take-over provides no difficulty.

Figure 6:
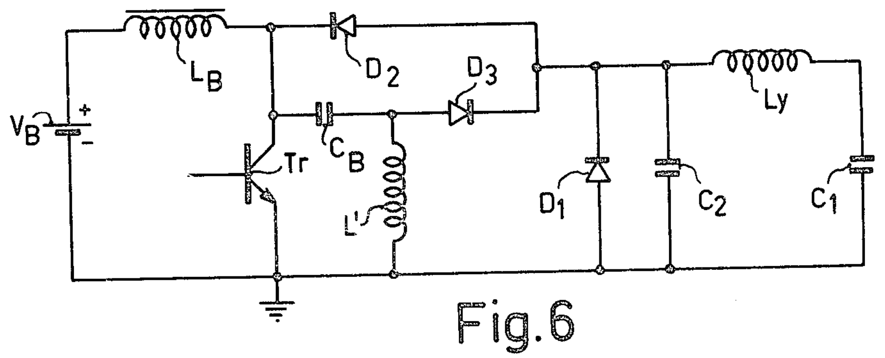

In the embodiment shown in FIG. 3 the supply source $V_B$ may be replaced by a capacitor the charge of which is replenished by a direct-voltage source via choke coils. However, owing to the provision of the coil L' one of these coils may be dispensed with. Thus the embodiment of FIG. 6 is obtained in which $C_B$ is the supply capacitor and $L_B$ is the choke coil connected between the source $V_B$ and the capacitor $C_B$. This addition of a choke coil and a capacitor enable the emitter of the transistor Tr of the embodiment of FIG. 3 to be earthed. It should be noted that part of the primary current and part of the secondary current flow via the capacitor $C_B$ through the choke coil $L_B$, depending upon the value of the inductance of the coil $L_B$ relative to that of the coil L'.

Similarly to the known circuit arrangement, in the circuit arrangements shown in FIGS. 3 to 6 the coil L' may be a winding of a transformer for producing supply voltages, whilst a winding of a high-tension transformer may be connected in parallel with the deflection coil $L_y$. It will be appreciated that the operation of the circuit arrangement according to the invention is not essentially influenced thereby.

It should be noted that the known part of the circuit arrangement, i.e. that comprising the elements $D_1$, $C_1$, $C_2$ and $L_y$, is shown very schematically only in the Figures. Other configurations are known in which for example the capacitor $C_1$ also ensures the S-correction of the deflection current whilst linearity-correction and centering circuits are provided. Furthermore, the said elements may be coupled by a transformer.

What is claimed is:

1. Circuit arrangement for producing a sawtooth current through a line deflection coil, which coil is part of a resonance circuit comprising also a trace capacitor and a retrace capacitor, switching means applying the voltage across the trace capacitor to the deflection coil at line frequency during the trace interval of the sawtooth current, which switching means comprise a first diode and a controlled switch connected in parallel with the said diode via a second diode, and an inductive element having a winding which is connected to the resonance circuit via a third diode, current flowing through the winding and the third diode during the cut-off period of the switch, characterized in that a current which is supplied to the controlled switch by a direct-voltage source connected between the winding and the switch also flows through the winding.

2. Circuit arrangement as claimed in claim 1, characterized in that both the series combination of the second and third diodes, which are connected with the same pass direction, and the series combination of the winding and the collector-emitter path of the controlled switch, which takes the form of a transistor, are connected in parallel with the direct-voltage source, the first diode being connected between the junction point of the second and third diodes and the junction point of the winding and the transistor.

3. Circuit arrangement as claimed in claim 1, characterized in that the direct-voltage source is in the form of a capacitor, a further direct-voltage source being connected via a choke coil to the controlled switch.

* * * * *